C. E. BEACH.
SIGNALING SYSTEM.
APPLICATION FILED JULY 31, 1915.
Reissued Mar. 20, 1917. 14,273.
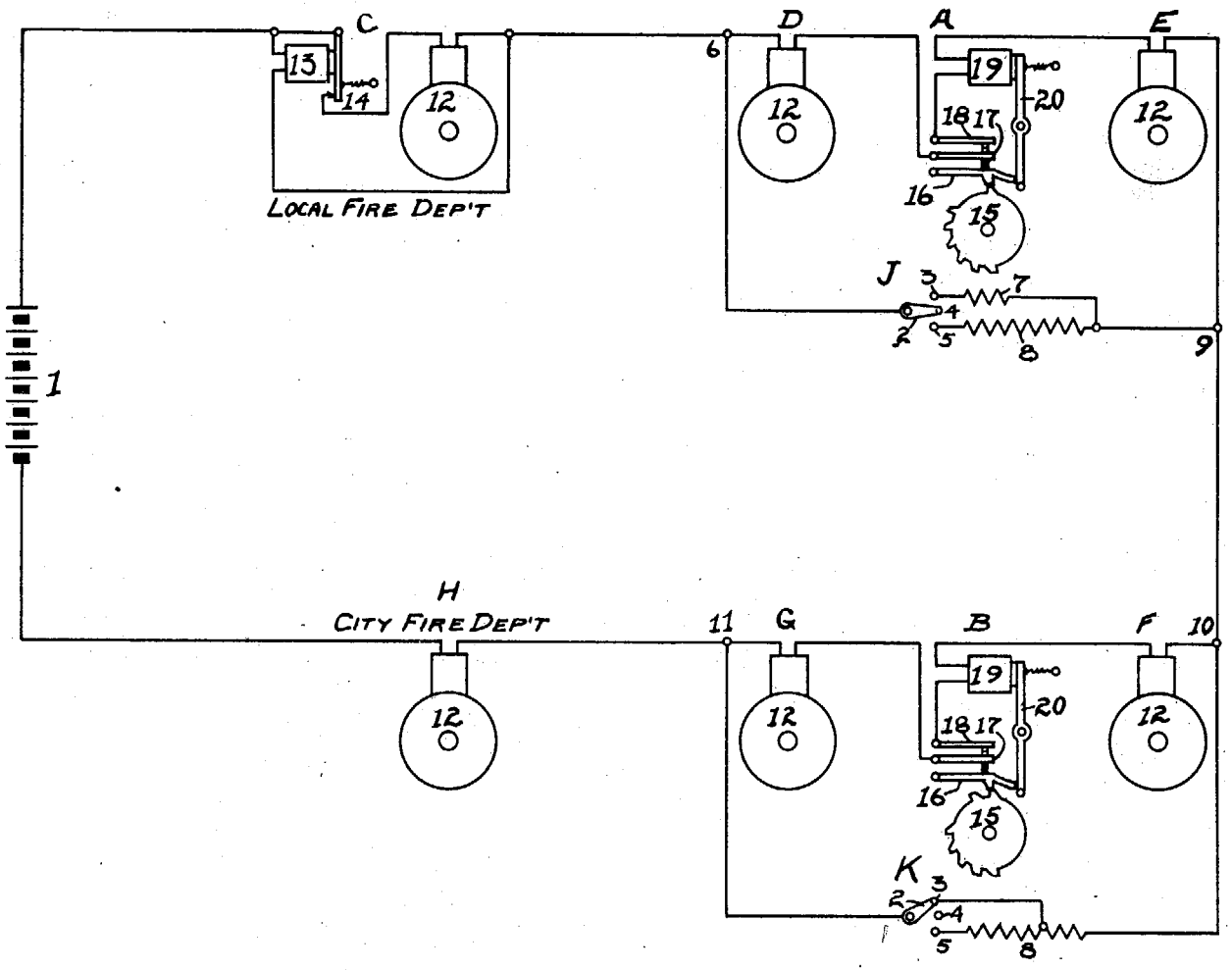
WITNESS
Clark Pool
INVENTOR
C. E. Beach.
THE NORRIS PETERS CO., PHOTO-LITHO., WASHINGTON, D. C.

UNITED STATES PATENT OFFICE.

CLARENCE E. BEACH, OF BINGHAMTON, NEW YORK, ASSIGNOR, BY MESNE ASSIGNMENTS, TO THE GAMEWELL FIRE ALARM TELEGRAPH COMPANY, OF NEWTON UPPER FALLS, MASSACHUSETTS, A CORPORATION OF NEW YORK.

SIGNALING SYSTEM.

14,273. Specification of Reissued Letters Patent. Reissued Mar. 20, 1917.

Original No. 1,120,995, dated December 15, 1914, Serial No. 813,892, filed January 23, 1914. Application for reissue filed July 31, 1915. Serial No. 43,043.

*To all whom it may concern:*

Be it known that I, CLARENCE E. BEACH, a citizen of the United States, residing at Binghamton, in the county of Broome and State of New York, have invented certain new and useful Improvements in Signaling Systems, of which the following is a specification.

My invention relates to series circuit alarm systems, in which there are a plurality of signal transmitting stations and a plurality of signal receiving stations on the same circuit. In a system of this kind it is often desirable to secure selective response of the various receiving devices depending upon the wish of the person in charge at the transmitting station.

An object of my invention is to provide in a series circuit switching mechanism associated with certain receiving and transmitting stations whereby said circuit may be adjusted, so that upon the operation of one of such transmitting stations all of the receiving devices in such circuit will not be responsive to such operation, but the associated receiving devices (as for example, those on the same floor or in the same building) and certain other receiving devices (as for example, those provided for the local fire department) will be responsive thereto.

Another object of my invention is to provide, in a series circuit, switching mechanism associated with certain receiving and transmitting stations whereby said circuit may be adjusted, so that upon the operation of one of such transmitting stations the associated receiving devices (as for example, those on the same floor or in the same building) will be the only receiving devices responsive thereto.

Another object of my invention is to provide, in a series circuit, switching mechanism consisting of a single switch associated with certain receiving and transmitting stations whereby said circuit may not only be adjusted by means of said switch, so that upon the operation of one of such transmitting stations the associated receiving devices (as for example, those on the same floor or in the same building) and certain other receiving devices (as for example, those provided for the local fire department) will be the only receiving devices responsive thereto, but whereby said circuit may also be adjusted, by means of said switch, so that upon the operation of one of such transmitting stations, the associated receiving devices (as for example, those on the same floor or in the same building) will be the only receiving devices responsive thereto, and whereby said circuit may also be adjusted, by means of said switch, so that upon the operation of one of such transmitting stations all receiving devices in the entire system will be responsive thereto (as for example, including those provided for a city fire department and those on other floors or in other buildings).

Another object of my invention is to provide, in a series circuit, apparatus in connection with certain receiving devices whereby the response of said receiving devices may be selectively controlled from transmitting stations located at a distance therefrom without running any extra wires between said receiving devices and said transmitting stations which may be a long distance apart.

Another object of my invention is to utilize means provided for the purpose of receiving certain signals for indicating a decrease in the strength of the source of current supply to a point inconsistent with the best operation of the system, without interfering with the use of such means for indicating the signals for which it is intended, by causing a single stroke bell to sound a multiplicity of strokes instead of only the usual single impulse, which might easily be missed.

Another object of my invention is to provide non-interference mechanism at the various stations, so adjusted that a fire signal has the right of way over a floor or drill signal and will not be interrupted thereby, but on the other hand, the floor or drill signal will be interrupted, and the fire signal transmitted to the fire departments without interference.

Another object of my invention is to provide non-interference mechanism which may be adjusted as between fire signals affecting only the floor or building and the local fire department and fire signals affecting the entire system including the city fire department so as to enable the exercise of choice between possible interference at the local fire department station and a correct signal on the affected floor, or a correct signal at the local fire department station and possible interference on the affected floor, giving the right of way to the signals considered to be of most importance in any particular location.

For the purpose of illustrating my invention, I have shown in the accompanying drawing a circuit supplied with energy by the source 1, and connecting the various transmitting, receiving and controlling stations. There are shown two transmitting stations A and B, six receiving stations, C, D, E, F, G and H and two controlling stations J and K. While the controlling stations are herein described as if they were distinct from their associated transmitting stations, it will be obvious to one skilled in the art that the mechanism of the controlling station might be located in or near the case containing the mechanism of the transmitting station.

Each controlling station is provided with switch mechanism which includes the switch arm 2 and the contacts 3, 4 and 5 with any one of which said arm is adapted to engage. At controlling station J the pivot of arm 2 is connected to the main circuit at junction 6. One terminal of the resistance 7 is connected to contact 3 and one terminal of the resistance 8 is connected to contact 5. The other terminals of resistances 7 and 8 are connected together and then to the main circuit at junction 9. At controlling station K the pivot of arm 2 is connected to the main circuit at junction 11. One terminal of the resistance 8 is connected to contact 5 and the other terminal of said resistance is connected to the main circuit at junction 10. Contact 3 is connected to an intermediate point on resistance 8. At both stations contact 4 is blank. At controlling station J the switch arm 2 is shown in engagement with contact 4, this being the position in which all receiving devices will be operated by a transmitting station associated with this controlling station, while at controlling station K the switch arm 2 is shown in engagement with contact 3, this being the position in which only the associated receiving devices will be operated by a transmitting station associated with this controlling station. At station J the value of resistance 8 is such that when the shunt circuit through it is closed, the current in the rest of the system will be decreased to such an extent by the opening of the shunted contact springs that electromagnet 13 will release its armature to open the circuit of the gong 12 associated therewith at station C while the current is not decreased to an extent sufficient to permit the retraction of the armatures of the gongs at stations F, G and H. Resistance 8 at station K is of similar value. The value of resistance 7 at station J and of the right hand portion of resistance 8 at station K is so low that when the shunt circuits including them are closed, the current in the rest of the system will be so little decreased by the opening of the shunted contact springs that the gongs in the rest of the system will not respond. The value of these resistances must be high enough so that the portion of the total current flow which passes through the path shunted by these resistances will be sufficient to cause operation of the devices therein.

The receiving stations C, D, E, F, G and H are provided with suitable receiving devices, such as the gongs 12. All of these gongs are so constructed that their armatures will not be retracted until the current through the electromagnets is very greatly decreased, it being a feature inherent in any such electromagnetic device that it will retain its armature in attracted position at a current strength considerably less than that required to move the armature into attracted position. Receiving station C, representing the station for the local fire department, for example, is provided with additional equipment including the electromagnet 13 and the switch 14 which is connected in the circuit of gong 12 at that station and is controlled by said electromagnet.

Electromagnet 13 is so adjusted that it will allow its armature to be retracted to open the circuit of its associated gong 12 whenever the current is decreased by a break in the circuit in parallel with either resistance 8. The relative resistances of the two parallel paths including the electromagnet 13 and the electromagnet of the gong 12 associated therewith should bear such relation to the resistance of that portion of the series circuit external to said two parallel paths that when these electromagnets are in parallel and the current flow in the circuit is decreased to a predetermined value such as might jeopardize the efficient operation of my system but not as greatly reduced as would be the case if the entire line current was forced to pass through one of the resistances 8 through the separation of its associated contact springs 17 and 18, said electromagnet 13 will permit its armature to retract sufficiently to break the circuit through gong 12 associated therewith and thereby permit said gong to sound, but in view of the increased current strength through electromagnet 13 upon the breaking of the shunt through gong 12, said electromagnet will be sufficiently energized to again attract its armature and thus close the shunt through said gong and thus vibrate said armature so long as such current decrease continues.

At the transmitting stations A and B typical transmitting mechanism is shown, including the signal wheel 15, the signaling lever 16, the contact springs 17 and 18, together with the non-interference electromagnet 19, and the armature structure 20 controlled thereby, said armature structure acting to hold the signaling lever in elevated position whenever the electromagnet 19 becomes deënergized while contacts 17 and 18 are closed.

When the switches are in the position shown in the drawing, the circuit is as follows: from source 1 to station C, passing through this station by two paths, the first path comprising electromagnet 13, energizing this electromagnet and causing it to attract its armature to close switch 14 completing the second path through switch 14 and gong 12, energizing the electromagnet of the gong; thence to junction 6, through gong 12 at station D, through contact springs 17 and 18 and electromagnet 19 at station A, through gong 12 at station E, to junction 9, to junction 10 where the circuit divides into two paths, first through stations F, B and G to junction 11 and second, from junction 10 to controlling station K, through right hand portion of resistance 8, to contact 3, to switch arm 2, to junction 11; here the two paths join and the circuit passes through station H and back to source 1. The current normally flowing over this circuit energizes the electromagnets of all the gongs 12. If now the signal wheel 15 at station A is rotated, the action of contact springs 17 and 18 thereat will be to open and close the circuit above traced and all the gongs in the entire system will respond.

When the switch arm 2 at station J is placed on contact 3, the stations D, A and E are shunted by resistance 7 and the rotation of the signal wheel 15 at station A will cause the response of only the gongs at stations D and E associated therewith, the value of resistance 7 being, as already explained, such that while this shunt is closed the separating of the springs 17 and 18 will not cause the other gongs to sound.

When the switch arm 2 at station J is placed on contact 5, the stations D, A and E are shunted by resistance 8 and the rotation of the signal wheel 15 at station A will cause the response of the gongs at stations D and E associated therewith and also of the gong 12 associated with electromagnet 13 at station C, the value of resistance 8 being, as already explained, such that while this shunt is closed, electromagnet 13 will release its armature to open the circuit of the gong 12 associated therewith at station C whenever the springs 17 and 18 are open, while the current is not then decreased to an extent sufficient to permit the retraction of the armatures of the other gongs.

The operation of the switch mechanism at controlling station K is similar to that of station J, the value of that portion of resistance 8 connected between contact 3 and junction 10 being approximately equal to that of resistance 7 similarly connected between contact 3 of station J and junction 9. Either method of connection may be used, the distinction being immaterial to the operation of my invention.

The operation of the mechanism at station C is as follows: When the armature of electromagnet 13 is retracted, all of the current in the circuit must pass through this electromagnet. However, as soon as the armature is moved to attracted position, electromagnet 13 is shunted by the electromagnet of the associated gong 12 and therefore receives only a portion of the total current. Hence it follows that while electromagnet 13 may be strongly energized while attracting its armature, when the shunt circuit is closed at contact 14, the energization of electromagnet 13 is decreased and said electromagnet is thereafter in condition to release its armature upon a very slight diminution of the current. The operation of the mechanism at station C will make known a gradual deterioration of the battery by the continued retraction and attraction of the armature of electromagnet 13 and the consequent continuous ringing of the gong 12 associated therewith. If a transmitting station should be operated even under this condition, the alarm would still be satisfactorily received.

The operation of the non-interference mechanism under the condition of more than one box being pulled at or about the same time will now be described. When two controlling stations have their switch arms 2 on contact 3 at each station, a transmitting station associated with one controlling station may be operated to transmit its alarm to the receiving stations associated therewith, and at the same time a transmitting station associated with the second controlling station may be operated to transmit its alarm to the receiving stations associated with said second station, without either interfering with the other. If the controlling stations have their switch arms 2 on their respective contacts 4, thus forming the usual series circuit, the non-interference electromagnets operate, in the manner well known in the art, to give the control of the circuit to the transmitting station which first has the line open while another has it closed. If one controlling station has its switch arm 2 on contact 3, as for a floor drill signal, and another controlling station has its switch arm 2 on contact 4, as for a general fire signal, the fire signal has the right of way and will hold back the floor signal if the floor signal is operated while the fire signal is being transmitted, while if the fire signal is operated while the floor signal is being transmitted, the floor signal will be interrupted and the gongs formerly responding thereto will thereafter respond to the fire signal. If one controlling station has its switch arm 2 on contact 4 and another controlling station has it switch arm 2 on contact 5, the result obtained when two boxes are operated at the same time will depend upon the adjustment of the non-interference armature and either of two effects may be obtained, as follows: If the non-interference armature is adjusted so as to be retracted at a comparatively high value of the current passing through its electromagnet and two stations are operated under these conditions, the station first having its contacts open while another has its contacts closed will obtain control of the line. With the same adjustment of the armatures, and two controlling stations each having their switch arms 2 on their respective contacts 5, the result will be the same, one station taking and holding control of the circuit.

In either of the above cases, if a transmitting station whose associated controlling station has its arm 2 on its contact 5 was the one which lost control of the circuit, there might be one or two blows upon the gongs associated with that controlling station and the rest of the signal from that station would be lost, while the local fire station C would receive a correct signal from the station which prevailed. If, on the other hand, it is deemed that the importance, under these circumstances, of assuring the immediate transmission of the signals, from both such stations to their respective groups of gongs outweighs the importance of assuring the receipt of the distinctive signal of one of such stations at station C, the non-interference armatures should be adjusted so that they will be retracted only at a comparatively low value of the current passing through their electromagnets, then if the transmitting stations of two controlling stations each having their switch arms 2 on their respective contacts 5 were pulled, both stations would operate station C. With this adjustment, the operation of a transmitting station whose associated controlling station had its arm 2 on its contact 4 would stop a transmitting station whose associated controlling station had its arm 2 on its contact 5 and transmit its own signal, thus at station C and the stations associated with the second controlling station, a partly transmitted signal might be interrupted to give the more important fire signal right of way.

In the use of non-successive transmitting devices with my invention, preference may thus be exercised through the adjustment of the non-interference armatures either to insure the transmission of a complete fire signal to the receiving devices provided for the local fire department or to the receiving devices on the affected floor.

If so-called "succession" transmitting devices are employed, the non-interference armatures should be adjusted so as to be retracted at a comparatively high current value and in this event, while the more important signal would always be given right of way and a less important signal or one of two equally important simultaneously started signals would be delayed, no signals would be lost.

It is obvious that in utilizing my invention other stations similar to any of those I have described may be located at any desired points in the circuit.

What I claim is:

1. In an electrical signaling system, a receiving device responsive only to relatively large current changes, a receiving device responsive to relatively small current changes, a transmitting device, one or more other receiving devices, two resistances, and means for connecting either resistance in shunt to said transmitting device and said other receiving devices, so constructed and arranged that when one resistance is so connected said transmitting device may cause said relatively small current change and when the other resistance is so connected said transmitting device may cause a current change less than said relatively small change.

2. In an electrical signaling system, a receiving device responsive only to relatively large current changes, a receiving device responsive to relatively small current changes, a transmitting device, one or more other receiving devices, two resistances, and means for connecting either resistance in shunt to said transmitting device and said other receiving devices.

3. In an electrical signaling system, a receiving device responsive only to relatively large current changes, an electromagnet, a shunt to said electromagnet, a receiving device in said shunt, a switch in said shunt controlled by said electromagnet whereby said receiving device is rendered responsive to relatively small current changes, a transmitting device, one or more other receiving devices, a resistance, and means for connecting said resistance in shunt to said transmitting device and said other receiving devices, so constructed and arranged that when said resistance is so connected said transmitting device may cause said relatively small current change.

4. A series circuit including a current source, a transmitting device so connected in said circuit as to be adapted to formulate a distinctive signal consisting of a series of relatively small current changes in the current flow through said circuit, and an electromagnet, a shunt around that portion of the series circuit including only said magnet, a receiving device in said shunt responsive only to comparatively large current changes, and a switch in said shunt adapted to be so controlled by said electromagnet as to render said receiving device responsive to signals so formulated by said transmitting device, said current source and said shunt being connected through said series circuit only.

5. In an electrical signaling system, an electromagnet, a shunt to said electromagnet, a receiving device in said shunt, a switch in said shunt controlled by said electromagnet, a transmitting device, other receiving mechanism, a resistance, and means for connecting said resistance in shunt to said transmitting device and said other receiving mechanism.

6. In an electrical signaling system, an electromagnet, a shunt to said electromagnet, a receiving device in said shunt, a switch in said shunt controlled by said electromagnet, such construction and arrangement that said receiving device will be responsive to relatively small current changes, a receiving device responsive only to relatively large current changes, a transmitting device, other receiving devices, a resistance, and means for connecting said resistance in shunt to said transmitting device and said other receiving devices.

7. In an electrical signaling system, an electromagnet, a shunt to said electromagnet, a receiving device in said shunt, a switch in said shunt controlled by said electromagnet, such construction and arrangement that said receiving device will be responsive to relatively small current changes, a receiving device responsive only to relatively large current changes, a transmitting device, other receiving devices, two resistances, and means for connecting either resistance in shunt to said transmitting device and said other receiving devices.

8. In an electrical signaling system, an electromagnet, a shunt to said electromagnet, a receiving device in said shunt, a switch in said shunt controlled by said electromagnet, such construction and arrangement that said receiving device will be responsive to relatively small current changes, a receiving device responsive only to relatively large current changes, a transmitting device, other receiving devices, a resistance, and means for connecting said resistance in shunt to said transmitting device and said other receiving devices, so constructed and arranged that when said resistance is so connected said transmitting device may cause said relatively small current changes.

9. In an electrical signaling system, an electromagnet, a shunt to said electromagnet, a receiving device in said shunt, a switch in said shunt controlled by said electromagnet, such construction and arrangement that said receiving device will be responsive to relatively small current changes, a receiving device responsive only to relatively large current changes, a transmitting device, other receiving devices, two resistances, and means for connecting either resistance in shunt to said transmitting device and said other receiving devices, so constructed and arranged that when one resistance is so connected said transmitting device may cause said relatively small current change and when the other resistance is so connected said transmitting device may cause a current change less than said relatively small change.

10. In an electrical signaling system, a receiving device responsive only to relatively large current changes, an electromagnet, a shunt to said electromagnet, a receiving device in said shunt, a switch in said shunt controlled by said electromagnet whereby said receiving device is rendered responsive to relatively small current changes, a plurality of transmitting devices, one or more receiving devices associated with each transmitting device, and means whereby each transmitting device may be operated either to cause response of all the receiving devices or only of its associated receiving devices and said receiving device responsive to relatively small current changes.

11. In an electrical signaling system, a receiving device responsive only to relatively large current changes, an electromagnet, a shunt to said electromagnet, a receiving device in said shunt, a switch in said shunt controlled by said electromagnet whereby said receiving device is rendered responsive to relatively small current changes, a plurality of transmitting devices, a resistance and one or more receiving devices associated with each transmitting device, and means whereby each transmitting device and its associated receiving devices may be shunted by the associated resistance, so constructed and arranged that when said resistance is so connected said transmitting device may cause response of its associated receiving devices and said receiving device responsive to relatively small current changes.

12. In an electrical signaling system, a receiving device responsive only to relatively large current changes, an electromagnet, a shunt to said electromagnet, a receiving device in said shunt, a switch in said shunt controlled by said electromagnet whereby said receiving device is rendered responsive to relatively small current changes, a plurality of transmitting devices, a resistance and one or more receiving devices associated with each transmitting device, and means whereby each transmitting device and its associated receiving devices may be shunted by the associated resistance.

13. In a series circuit, a receiving device responsive only to relatively large current changes, a receiving device responsive to relatively small current changes, a transmitting device, one or more other receiving devices associated with said transmitting device, a movable switch member connected with said series circuit at one side of said transmitting device and said associated receiving devices, a contact coöperating with said movable member to connect a relatively high resistance from said one side to the other side of said transmitting device and said associated receiving devices, and a second contact coöperating with said movable member to connect a relatively low resistance between said sides, said movable member being arranged to open its circuit when disengaged from both of said contacts.

14. In a signaling system having a normally closed series circuit including an electromagnet, signal transmitting devices and such circuit connection that said transmitting devices may be partially shunted out without shunting said electromagnet; a shunt around that portion of said series circuit including only said electromagnet, a receiving device in said shunt, and a switch in said shunt controlled by said electromagnet.

15. In a signaling system having a normaly closed series circuit including an electromagnet, signal transmitting devices and such circuit connections that said transmitting devices may be partially shunted out without shunting said electromagnet; a shunt around that portion of said series circuit including only said electromagnet, a receiving device in said shunt, and a switch in said shunt controlled by said electromagnet, all so proportioned and adjusted that said receiving device is rendered responsive to the current changes incident to the operation of said partially shunted out signaling devices.

16. In a closed circuit electrical signaling-system having signal-transmitting stations, a signal-receiving station having an electromagnetic controlling-means, a shunt around and governed by such means and having a receiver, the current paths through the electromagnetic controlling - means and the shunt having such relation to each other as to cause a repeated governing control of the shunt by said means in subnormal conditions of the system current strength to a predetermined limit, and a definite single governing control of the shunt by said means in a subnormal condition beyond such predetermined limit.

17. In a closed circuit electrical signaling system having signal transmitting stations, electromagnetically controlled receiving means so connected and arranged as to be adapted to manifest the signals of said transmitting stations by acting but once for each break or comparatively large decrease in current flow in said circuit and to be adapted to manifest a comparatively small decrease in the strength of the current flow in said circuit by repeated action.

18. In a closed circuit electrical signaling system having a plurality of transmitting stations; a signal receiving station adapted to respond to the signals of said transmitting stations and comprising,— an electromagnet, a shunt to said electromagnet, and a switch in said shunt controlled by said electromagnet, the resistances of the current paths through the electromagnet and through the shunt being so related to each other and to the resistance of the remainder of the signaling circuit as to cause continuous operation of said switch whenever the line current flow, while subnormal to at least a predetermined extent, is greater than a predetermined minimum.

19. In a closed circuit electrical signaling system having a plurality of transmitting stations; a signal receiving station adapted to respond to the signals of said transmitting stations and comprising,— an electromagnet, a shunt to said electromagnet, a receiving device in said shunt, and a switch in said shunt controlled by said electromagnet, the resistances of the current paths through the electromagnet and through the shunt being so related to each other and to the resistance of the remainder of the signaling circuit as to cause continuous operation of said receiving device whenever the line current flow, while subnormal to at least a predetermined extent, is greater than a predetermined minimum.

20. In a signaling system having a normally closed series circuit including an electromagnet and signal transmitting devices; a shunt around that portion of said series circuit including only said electromagnet, a resistance in said shunt, and a switch in said shunt controlled by said electromagnet, the resistances of the current paths through the electromagnet and through the shunt being so related to each other and to the resistance of the remainder of the signaling circuit that at normal line current said switch will hold said shunt closed, at line current strengths below a predetermined value and during open circuit periods said switch will open said shunt, and at subnormal line current strengths which are greater than said predetermined value said switch will not act continuously, alternately breaking and closing said shunt.

21. In an electrical signaling system: a signal circuit serially including a current source, two classes of general receiving devices, local receiving devices, and signal transmitting devices; switch mechanism associated with each of a plurality of said transmitting devices, conductors each including suitable resistance and adapted to form a current path in shunt with a portion of the series circuit including certain local receiving and transmitting devices, and so controlled by said switch mechanism that any switch mechanism may be set to so adjust the circuit conditions of said signaling system that the operation of its associated transmitting device will cause response thereto of certain local receiving devices without causing response of all local receiving devices or any of the general receiving devices, and so that any switch mechanism may be set to so adjust the circuit conditions of said signaling system that the operation of its associated transmitting device will cause response thereto of said certain local receiving devices and one class of the general receiving devices without causing response of the other local or general receiving devices.

22. In an electrical signaling system: a signal circuit serially including a current source, two classes of general receiving devices, local receiving devices, and signal transmitting devices; switch mechanism associated with each of a plurality of said transmitting devices, conductors each including suitable resistance and adapted to form a current path in shunt with a portion of the series circuit including certain local receiving and transmitting devices, and so controlled by said switch mechanism that any switch mechanism may be set to so adjust the circuit conditions of said signaling system that the operation of its associated transmitting device will cause response thereto of certain local receiving devices without causing response of all local receiving devices or any of the general receiving devices, so that any switch mechanism may be set to so adjust the circuit conditions of said signaling system that the operation of its associated transmitting device will cause response thereto of said certain local receiving devices and one class of the general receiving devices without causing response of the other local or general receiving devices, and so that any switch mechanism may be set to so adjust the circuit conditions of said signaling system that the operation of its associated transmitting device will cause response thereto of all local and general receiving devices.

23. In an electrical signaling system: a signal circuit serially including a current source, a general receiving device, local receiving devices, and a plurality of signal transmitting devices each having noninterference mechanism; switch mechanism associated with each of a plurality of said transmitting devices, conductors each including suitable resistance and adapted to form a current path in shunt with a portion of the series circuit including certain local receiving and transmitting devices, and so controlled by said switch mechanism that any switch mechanism may be set to so adjust the circuit conditions of such signaling system that the operation of its associated transmitting device will cause response thereto of the general receiving device and a predetermined plurality of the local receiving devices without causing response of all local receiving devices and without causing such changes in the current flow throughout such signaling system as will prevent the transmission of signals from any other transmitting device.

24. In an electrical signaling system: a signal circuit serially including a current source, two classes of general receiving devices, local receiving devices, and a plurality of signal transmitting devices each having noninterference mechanism; switch mechanism associated with each of a plurality of said transmitting devices, conductors each including suitable resistance and adapted to form a current path in shunt with a portion of the series circuit including certain local receiving and transmitting devices, and so controlled by said switch mechanism that any switch mechanism may be set to so adjust the circuit conditions of such signaling system that the operation of its associated transmitting device will cause response thereto of certain local receiving devices without causing response of all of said local receiving devices, the general receiving devices, or of the noninterference mechanism associated with other transmitting devices, and so that any switch mechanism may be set to so adjust the circuit conditions of said signaling system that the operation of its associated transmitting device will cause response thereto of said certain local receiving devices and one class of the general receiving devices without causing response of the other local or general receiving devices or of the noninterference mechanism associated with other transmitting devices.

25. In an electrical signaling system: a signal circuit serially including a current source, two classes of general receiving devices, local receiving devices, and a plurality of signal transmitting devices each having noninterference mechanism; switch mechanism associated with each of a plurality of said transmitting devices; conductors each including suitable resistance and adapted to form a current path in shunt with a portion of the series circuit including certain local receiving and transmitting devices, and so controlled by said switch mechanism that any switch mechanism may be set to so adjust the circuit conditions of such signaling system that the operation of its associated transmitting device will cause response thereto of certain local receiving devices without causing response of all of said local receiving devices, the general receiving devices, or of the noninterference mechanism associated with other transmitting devices, so that any switch mechanism may be set to so adjust the circuit conditions of said signaling system that the operation of its associated transmitting device will cause response thereto of said certain local receiving devices and one class of the general receiving devices without causing response of the other local or general receiving devices or of the noninterference mechanism associated with other transmitting devices, and so that any switch mechanism may be set to so adjust the circuit conditions of said signaling system that the operation of its associated transmitting device will cause response thereto of all local and general receiving devices and the noninterference mechanism associated with other transmitting devices.

26. In a signaling system having a normally closed series circuit including an electromagnet and signal-transmitting devices, controlling-means associated with the transmitting-devices for partially shunting said transmitting-devices without shunting the electromagnet, a shunt around that portion of said series circuit including only said electromagnet, a receiving-device in said shunt, and a switch in said shunt so controlled by said electromagnet as to be responsive to the operation of said transmitting-devices under various conditions of said series circuit including conditions under which any portion of said circuit including one or more transmitting devices, but not including said electromagnet, is partially shunted out.

In witness whereof, I hereunto subscribe my name, this 29th day of July, A. D. 1915.

C. E. BEACH.

Witness:
M. L. THOMAS.

Copies of this patent may be obtained for five cents each, by addressing the "Commissioner of Patents, Washington, D. C."